United States Patent [19]

O'Hare

[11] Patent Number: 4,877,589
[45] Date of Patent: Oct. 31, 1989

[54] NITROGEN FIXATION BY ELECTRIC ARC AND CATALYST

[76] Inventor: Louis R. O'Hare, 6101 Sequoia Rd., NW., Apt. A-20, Albuquerque, N. Mex. 87120

[21] Appl. No.: 246,212

[22] Filed: Sep. 19, 1988

[51] Int. Cl.[4] .............................................. C01B 21/20
[52] U.S. Cl. ................................ 422/186.24; 422/904; 422/906; 204/178; 204/179; 423/402; 423/405
[58] Field of Search .................. 422/186.21, 186.23, 422/186.24, 186.25, 904, 905; 204/177, 178, 179; 423/402, 405, 400

[56] References Cited

U.S. PATENT DOCUMENTS

| | | | |
|---|---|---|---|
| 870,518 | 11/1907 | Maywald | 422/186.25 |
| 878,710 | 2/1908 | Campbell et al. | 422/186.21 |
| 926,413 | 6/1909 | Helbig | 204/179 |
| 1,033,126 | 7/1912 | Siebert | 204/179 |
| 1,175,007 | 3/1916 | Moody et al. | 204/178 |
| 1,266,717 | 5/1918 | Rossi | 204/179 |
| 1,291,660 | 1/1919 | Summers | 204/179 |
| 1,372,541 | 3/1921 | Pearson | 204/179 |
| 1,486,990 | 3/1924 | Siebert | 204/179 |
| 2,421,744 | 6/1947 | Daniels et al. | 423/405 |
| 2,447,426 | 8/1948 | Ödberg | 422/186.21 |
| 2,485,481 | 10/1949 | Cotton | 204/179 |
| 4,267,027 | 5/1981 | Amouroux et al. | 204/179 |
| 4,451,436 | 5/1984 | O'Hare | 422/186.29 |

Primary Examiner—John F. Terapane
Assistant Examiner—Susan Wolffe

[57] ABSTRACT

The fixation of nitrogen by electric arc process is made more efficient by this system which combines a low frequency electric discharge and a catalyst in such a way that an electric arc is formed entirely within a catalyst bed when the reactant gases to be reacted by the arc are admitted to the interior of the catalyst bed and form a cavity there as they expand outward, the bubble-like cavity formed within the mass of catalytic particles thereby providing a type of arc chamber from which plasma state gas particles immediately contact the catalyst particles as the plasma state, gas particles are thrust outwards from the arc zone. After the reactant gases react on catalyst particles, the outward pressure moves the product gases farther through the catalyst bed where the products are then shielded from destructive ultraviolet light from the arc.

14 Claims, 3 Drawing Sheets

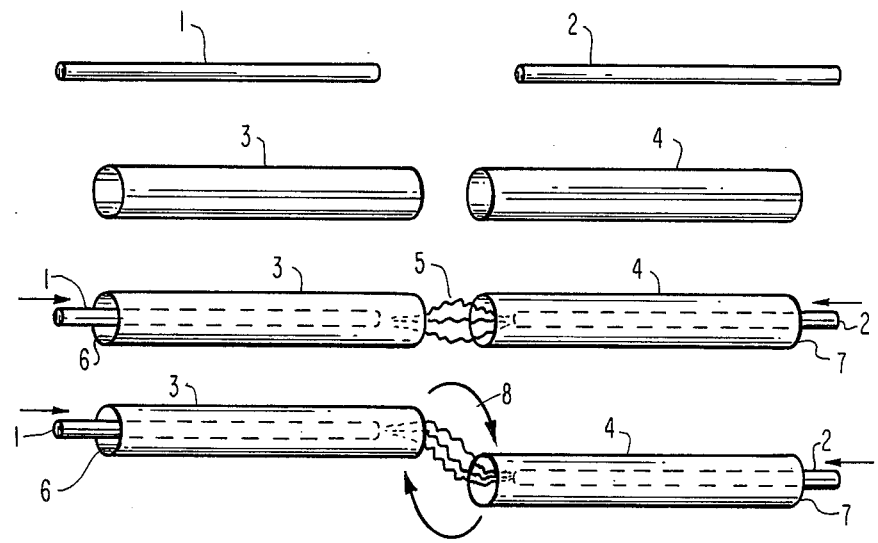
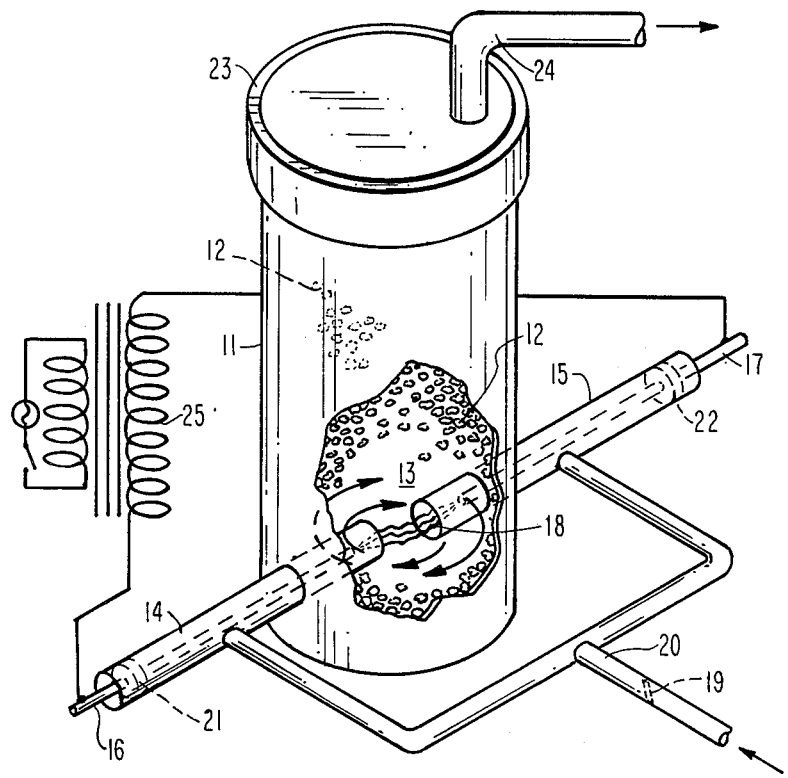
FIG. 1
FIG. 2

NITROGEN FIXATION BY ELECTRIC ARC AND CATALYST

This invention is a system for reacting nitrogen with other gases such as oxygen in order to provide compounds of fixed nitrogen. It especially resembles my previous invention entitled, "Nitrogen Fixation by Plasma and Catalyst" which is patented under U.S. Pat. No. 4,451,436. Both that previous system and this present one follow upon a long history of synthetic nitrogen fixation by the use of the electric arc or plasma. The history of some predominant former systems is summarized in the above cited invention as well as in my copending U.S. patent application Ser. No. 07/121,116. A distinguishing characteristic of my previous cited patent and patent application is that each employ a catalyst in association with an electric plasma. This feature distinguishes them from other prior art but it is a feature in common with the invention of Jaques Amouroux, namely his U.S. Pat. No. 4,267,027 which also employs a catalyst with a plasma. The use of a catalyst with a plasma is also expressed in the bulletin of the French Chemical Society which is entitled, "Bulletin de La Societe Chimique de France 1986 N° 2" in an article entitled, "Synthese des oxydes d' azote par voie plasma" by S. Cavadias and J. Amouroux on pages 147–158. Specifically, on pages 152-154 of this particle means are disclosed for applying a plasma torch to a fluidizied catalytic bed. The use of the catalyst bed was first described in my own U.S. Pat No. 4,451,436, nevertheless it does seem clear from these later articles by S. Cavadias and J. Amouroux that the art has been extended to include means of controlling the fluidity of the catalytic bed by the application of a separate upward draft of gas through the catalytic bed. Similarly, the use of a plasma torch as shown by S. Cacadias and J. Amouroux on pages 152 and 154 of the cited 1986 article presents an alternate means of contacting the catalyst with the plasma state gases. Earlier my U.S. Pat. No. 4,451,436 had disclosed the use of a single electrode discharge as a means of contacting a catalytic bed with a plasma.

Now in place of the single electrode discharge and in place of the 40 MHz plasma torch, the present invention discloses an advantageous simplification for contacting a fluidized catalytic bed with a very simple electric discharge. The purpose of the present invention is to reduce the complexity of the former systems by removing the need for radio-frequency generators. The present invention uses neither a single electrode plasma nor a radio-frequency plasma torch but rather it employs the plasma from a simple electric arc and the means of contacting the catalyst with the arc are unique.

The improvement in the art is essentially one of advantageous simplification Whereas in the prior art both the generation of the plasma as well as the thrust of the plasma gas into the catalyst were accomplished by a radio-frequency power source heating the gas, in the present invention a simple 60 Hz current is all that is required. The voltage on this current is above 6 KV and usually at least 15 KV or higher. In the present invention there is no requirement for a 50 MHz radio-frequency generator to power a single electrode discharge. Similarly, in the present invention the need for a plasma torch with a 40 MHz generator is obviated although it was a clear requirement described on page 151 of the cited article of S. Cavadias and J. Amouroux.

However, the improvement in the art of nitrogen fixation, using a catalytic bed with an electric plasma, goes beyond advantageous simplification to an increase in energy efficiency. A principal weakness in the efficiency of the prior art systems was their reliance on a radio-frequency power source. Radio-frequency generators are only about 75% efficient. On the other hand simple electric voltage transformers are generally 95% efficient or better. This disparity in electrical efficiency is due in large part to the additional energy required to heat the filaments and cathodes of the radio-frequency vacuum tubes that are found in high power radio-frequency generators. The plates and other components of a radio-frequency generator radiate heat as well, and this heat represents a waste of energy. When a 60 Hz transformer is used to increase voltage to provide a simple electric 60 Hz arc then high power vacuum tubes are not necessary. The wasted energy the tubes would have produced in generating radio-frequency power is removed from a system that does not rely on radio-frequency power. This is the case with the present invention which improves the prior art by not requiring radio-frequency power. The present invention does not rely on radio-frequency power source because of its unique way of applying a simple high voltage arc to a plasma. In this present invention the electric arc is formed between two electrodes which are both within the catalyst bed. Plasma gas directed between the electrodes forces aside some quantity of the total catalyst volume and produces a cavity between the electrodes. The discharge across the electrodes takes place in the cavity between the electrodes. The pressure of the reacting gases in the cavity maintains the cavity in the center of a catalytic bed. Plasma state gas particles, such as excited state nitrogen and oxygen, move outward from the electric discharge zone and contact catalyst particles, both moving the particles outward as well as reacting on the particles they contact. Product compounds such as nitric oxide gas move outward through the catalyst particles that surround the cavity and are shielded by these particles from the ultraviolet radiation emitted by the plasma in the cavity.

In a principal embodiment of the basic inventive concept, the nitrogen and oxygen gases, which are admitted to the plasma region to be heated and electrically excited there by the plasma, are impelled into that region with significant velocity in order to generate turbulence in the plasma zone. The turbulence then vigorously agitates the catalytic particles within the catalyst chamber causing them to move rapidly in and out of the plasma zone. The turbulent motion of the plasma gases moves catalyst particles in and out of contact with the wall of the catalyst chamber. Then the rapid temperature change of the catalyst particles as they are first heated by the electric arc and subsequently cooled by the walls of the chamber promotes an accelerated absorbtion-desorbtion of gases reacting on the catalyst particles. The turbulence also brings a large number of catalyst particles into contact with the excited and reactive gas particles being emitted by the the arc.

In one embodiment the turbulence generated by the high velocity of the plasma state gases is in the form of a vortex. In this embodiment reactant gases are admitted through sleeves which encircle the electrodes. The electrodes are positioned coaxially in the center of cylindrical sleeves which enter through the wall of the catalyst chamber from opposite sides of the chamber. The reactant gases flow inward along the length of the cylindrical sleeves in a space between the electrodes and the inner wall of each sleeve. The direction of each gas flow is approximately radially inward toward the center of the catalyst chamber but the direction of each gas stream is slightly off-set from a direction toward the center and each stream is directed toward a point on either side of a center point so that the opposing streams impinge upon each other at a tangent to produce a vortex in the center of the catalyst bed. Because the electrodes are each located within a sleeve that transports reactant gas, the discharge of electricity taking place across the opposing electrodes must pass through the vortex generated by the impinging gas streams.

In another embodiment gas streams from multiple sleeves directly impinge against each other in the center of the catalyst chamber to produce the cavity for the electric arc, and turbulent eddy currents agitate the catalyst particles on all sides of the cavity.

Clarification is made by referring now to the drawings.

FIG. 1 shows side by side electrode bars with sleeves beneath and electrodes in the sleeves placed side by side and then placed in parallel planes.

FIG. 2 shows a cylindrical, catalytic chamber with electrodes for an arc and electrode sleeves entering through the base of the cylinder and a vortex generated cavity within the catalyst bed.

Figure 3:
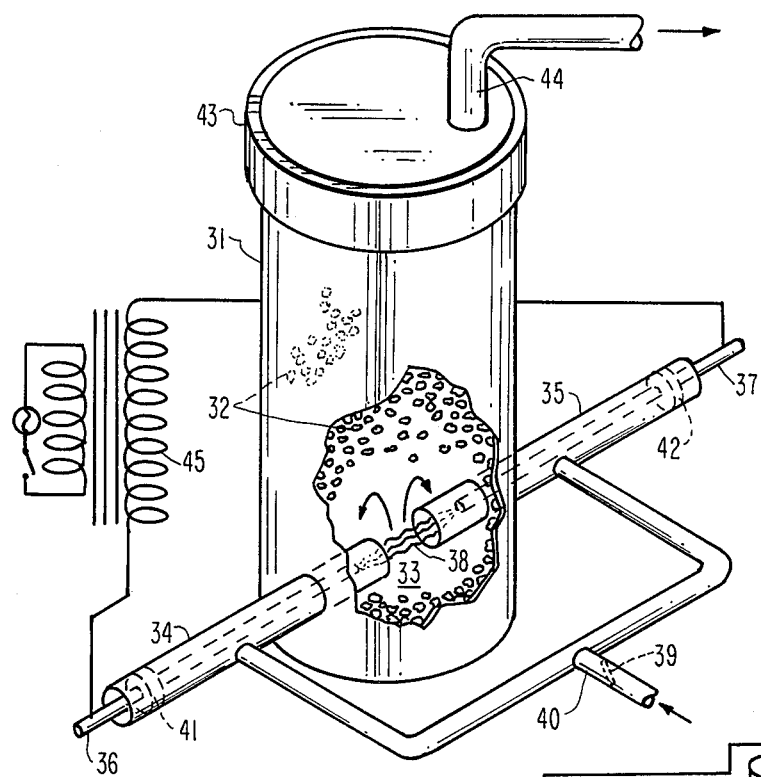
FIG. 3 shows a cylindrical, catalytic chamber with electrodes and sleeves at its base and a gas-flow generated cavity within the catalyst bed but without a vortex flow pattern.

Referring now to FIG. 1 of the drawings, the electrodes 1 and 2 are metal rods such as rods of platinum or tungsten. The sleeves 3 and 4 are cylindrical tubes of electrically insulating material such as of fused quartz or high temperature ceramic in the form of alumina or other refactory material. The rods 1 and 2 fit coaxially within sleeves 3 and 4. Electrode rods 1 and 2 each have one end near an end of the other electrode in order that ah electric arc might be established across 1 and 2 when a very high electric voltage is placed across them. In a principal embodiment electrodes 1 and 2 are recessed somewhat inward from the ends of sleeves 3 and 4 at the ends of 3 and 4 which are close to each other. This means that part of the arc formed between 1 and 2 will be enclosed by a small portion of sleeves 3 and 4. Reactant gases enter and flow to the zone of electric arc 5 by passing through the cylindrical cavities 6 and 7. Cavity 6 is between 1 and 3 and cavity 7 is between 2 and 4. In one embodiment sleeves 3 and 4 are in the same plane. The purpose for having 3 and 4 in the same plane is shown subsequently in FIG. 3. In another embodiment the sleeves are placed in parallel planes and the gas streams moving toward each other impinge against each other obliquely to produce a gas vortex in the vortex zone 8 between the two sleeves 3 and 4. The function of the electrodes with their respective sleeves and gas ducting cavities will be further explained in subsequent drawings when the relationship of these elements to the entire reactor is elucidated.

Referring then to FIG. 2, the vertical cylinder 11 contains the catalyst bed 12 in which the arc cavity 13 is produced by the inrush of reactant gases through electrode sleeves 14 and 15. Sleeves 14 and 15 correspond to sleeves 3 and 4 of FIG. 1. In this FIG. 2 separate columns of reactant gases, one through 14 and the other through 15, impinge against each other obliquely and produce a vortex of reactant gases and catalyst particles in 13. Both the impact of the reactant gases as well as the centrifugal force of the vortex whirling the particles in a circle impell the particles outward from 13. An electric arc 18 is formed between electrodes 16 and 17 in cavity 13 by an high voltage potential placed across 16 and 17. The electrodes 16 and 17 correspond to electrodes 1 and 2 of FIG. 1. In a principal embodiment the voltage applied across 16 and 17 is from 15 kilovolts to 100 kilovolts or more, but it is not intended to limit the inventive concept to any particular range of voltage as long as the voltage is sufficient to provide an arc across the electrodes. For instance large industrial models of the invention are able to employ the voltage available from a large X-Ray transformer. The separation distances between the electrodes 16 and 17 will by proportionately great as will the volume of reactant gas flow. In the case in which the voltage is 100 KV or more the electrode separation distance will be several inches. Conversely in a very small model of the invention the electrode separation distance would be approximately one quarter of an inch for an arc voltage of only six thousand volts.

Reactant gases, such as nitrogen and oxygen, enter electric are zone 18 through sleeves 14 and 15 and are converted by 18 into the plasma state. When heated by 18 the plasma state reactant gases expand outward from 13 vigerously and contact catalytic particles on all sides of cavity 13. Then the reactant gases such as nitrogen and oxygen in the plasma state react and combine on the catalyst particles to form product gases such as nitric oxide. Under the energetic outward pressure from 13 the product gases are immediately driven into the dense body of the catalytic bed 12. By moving beyond the arc zone in cavity 13, the product gases are shielded from the destructive effects of the ultraviolet light emitted by arc 18. This shielding prevents the disassociation of the product gas by the influence of ultraviolet radiation. In the case of a particular product, for instance, it prevents the disassociation of nitric oxide into nitrogen and oxygen. To effect the shielding function which is inherent to the present inventive concept, it is necessary to provide an area of densely compacted catalytic particles. The purpose of a dense aggregation of particles is to provide a type of gas permeable wall of particles which will be opaque to ultraviolet light, but sufficiently porous as to permit the diffusion of product gas away from the arc zone. In the present invention a compression of particles that places the particles in close proximity is achieved by locating the particles in a vertical column in such a manner that the physical weight of the column tends to compress together those particles closer to the bottom of the column. The height of the column is instrumental in determining how densely aggregated are the particles of catalyst in the vicinity of the electric arc. When the column is very high, significant gas pressure and plasma energy are required to displace particles and form a cavity at the base of the column. In those embodiments of the inventive concept configured for arc plasmas with very high energy density, large amounts of electric current flow through the arc and large amounts of reactant gas pass through the arc. In such a case catalyst particles would be widely dispersed by the flow of energetic gas, and shielding of product gases could not take place unless there were a counter force of sufficient magnitude as to compress together the catalyst particles. This invention then consists partly in the employment of a column of catalytic bed above the reaction zone of the arc to effect some compacting of catalytic particles near the arc for the purpose of shielding the product gases in the compacted catalyst. Reactant gas inlet manifold 20 distributes the gases to be reacted to sleeves 14 and 15. The valve 19 regulates the flow rate of reactant gases to the electric arc 18. The seals 21 and 22 prevent gas leakage outward from between 14 and 16 and from between 15 and 17 respectively. Catalyst chamber cover 23 with its exit port 24 respectively seal the top of catalyst chamber 11 and exhaust product gases. The low frequency transformer 25 powers electrodes 16 and 17 to produce the low frequency arc 18. Transformer 25 is an high voltage transformer such as a transformer of the type employed to drive an X-Ray tube or, for laboratory models of the invention, a neon light transformer may be used for 25. The transformer 25 is of the kind which operates on 60 Hz or 50 Hz alternating current. The bed of catalytic material 12 is in the form of pellets and granules of tungsten oxide or it may be in the form of tungsten oxide powder in another embodiment. In still another embodiment the catalyst bed is composed of molybdenum oxide powder and molybdenum oxide granules and pellets. The preferred oxides of tungsten and molybdenum both in powder and pellet form are the trioxides of these metals. Another suitable catalyst for the combination of nitrogen and oxygen is the powdered and pellet form of chromic oxide, $Cr_2O_3$. Tantalum oxide and magnesium oxide also provide catalyst 12 in an alternate embodiment as does copper chromite. More complex forms of catalyst are also used in other embodiments such as barium promoted copper chromite and catalysts such as any of the above mentioned catalysts which are supported on alumina gel or on silica gel or on combinations of these gels. When these catalysts are employed in the form in which they are supported on a porous gel they are generally used in the pellet form, but in some embodiments the pellets supporting the catalyst are ground to a powder to increase their mobility and to enhance the formation of the cavity chamber 13. For instance tungstic oxide, $WO_3$, which is supported on alumina is ground to a powder and employed as a powdered catalyst for application as catalyst 12.

Chamber 11 is a cylinder of fused quartz in one embodiment in which the cylindrical sleeves 14 and 15 enter through the wall of 11 and are fused to 11 in those positions in which 14 and 15 pass through the wall of 11. In another embodiment the catalyst chamber 11 is a metallic cylinder and the electrically insulating sleeves 14 and 15 are ceramic tubes which extend through the walls of 11 and and are sealed to the walls of 11 at those openings through which they enter 11.

Referring then to FIG. 3, chamber 31 with its cover 43 and exit port 44 correspond to chamber 11, cover 23 and exit port 24 respectively of FIG. 2. Similarly, electrode sleeves 34 and 35 with electrodes 36 and 37 correspond respectively to 14,15,16 and 17 of FIG. 2. In the same way the manifold 40 with its valve 39 correspond to 20 and 19 of FIG. 2. In this FIG.3, the transformer 45 functions in the same way that 25 functions in FIG. 2. However, in this FIG.3, the electrode sleeves 34 and 35 are not off-set to provide a horizontal vortex but are rather in the same plane, and the gas streams from each oppose each other directly in order to produce swirling eddy currents of various types and in a multiplicity of directions. In this embodiment the reactant gas turbulence is more random in nature and the pressure of the streaming gas produces a bubblelike cavity 33 by forcing aside particles of the catalyst 32. The electric arc 38 traverses the cavity 33 and raises the reactant gases to plasma temperature. In the plasma state the reactant gases react on the catalyst particles which form the boundaries of cavity 13 and combine to form product species. In the principal embodiment the reactants are nitrogen and oxygen and the product is nitric oxide. The seals 41 and 42 correspond to seals 21 and 22 of FIG.2.

Figure 4:
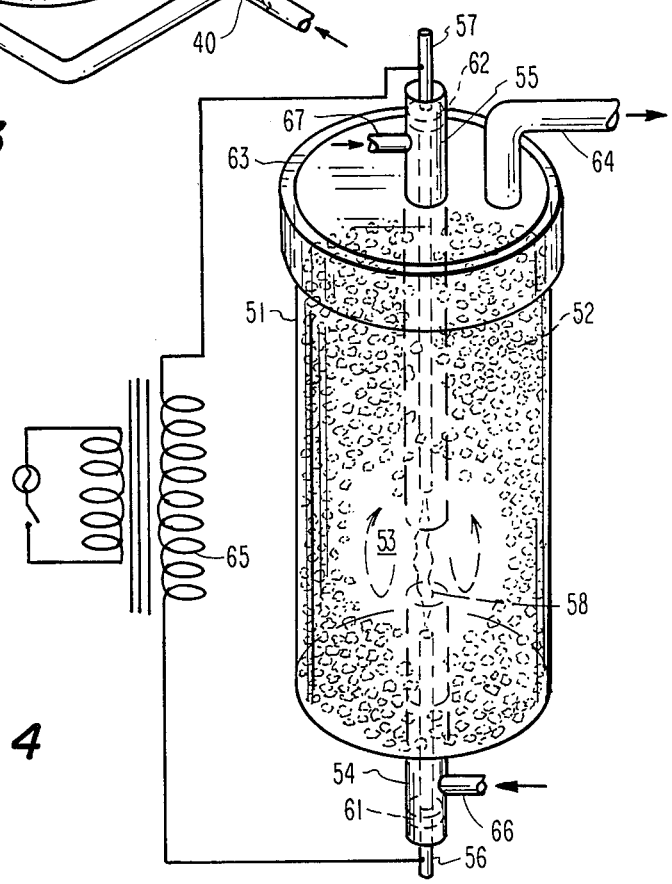
FIG. 4 shows a cylindrical, catalytic chamber with vertical electrodes and vertical electrode sleeves with a cavity in the catalyst bed between the opposing electrodes.

In FIG. 4 the reaction chamber 51 serves the same function as chamber 11 of FIG.2. The catalyst bed 52 corresponds in function to 12 of FIG.2. In this FIG.4 chamber cover 63 has an exit port 64 to remove product gases. Electrode sleeve 55 with electrode 57 are similar to electrode 2 and sleeve 4 of FIG.1, but in this FIG.4,55 and 57 pass through the center of cover 63 and are sealed to the cover at the point on the circumference of 55 where it passes through 63. The electric arc 58 is in an approximately vertical plane and extends from electrode 57 to electrode 56. The electrode sleeve 54 corresponds to sleeve 3 of FIG.1 and it houses electrode 56 the way electrode sleeve 3 encloses electrode 1 in FIG.1. In this FIG.4 reactant gases enter both sleeve 54 and sleeve 55 and pass through these sleeves to arc 58 and cavity 53. The pressure of the reactant gases and the heat they receive from 58 produces cavity 53 and forces the reactants onto the catalyst particles of 52 where they react to provide product species such as nitric oxide when nitrogen and oxygen are the reactants. The product species are quickly driven into the body of the catalyst where they are shielded from the pohtodissociation energy associated with the ultraviolet light from 58. The high voltage transformer 65 corresponds to transformer 25 in FIG.2. The seals 61 and 62 correspond to seals 21 and 22 in FIG.2. Reactant gases are admitted through inlet ducts 66 and 67.

Figure 5:
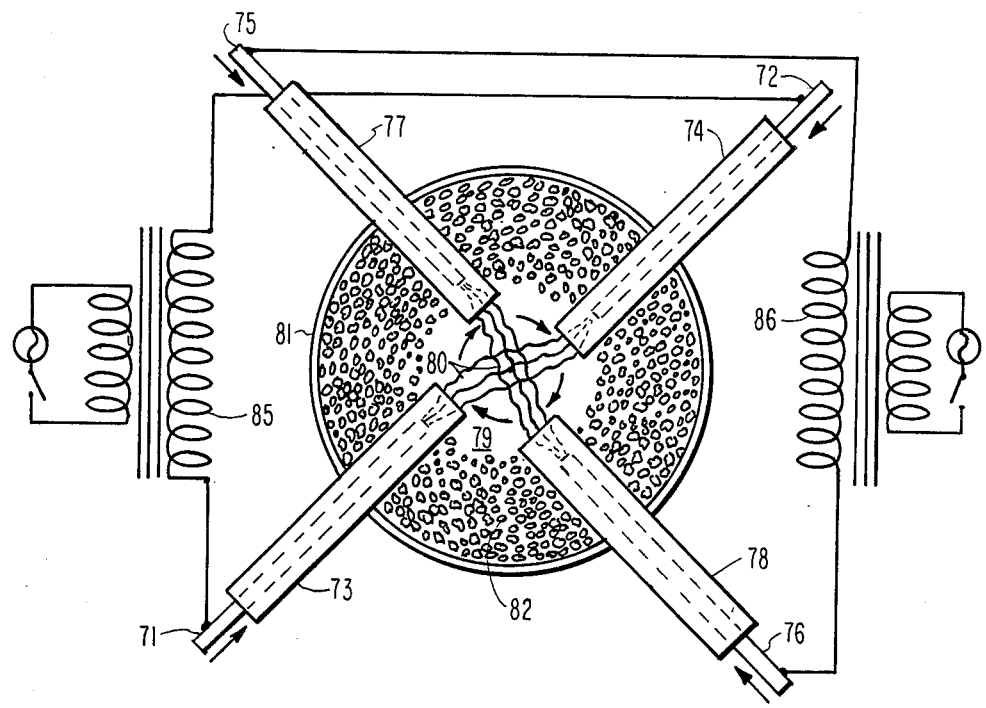
FIG. 5 shows a top view of a catalyst chamber and four electrodes with sleeves at the bottom of the chamber for producing a vortex in the catalyst by means of reactant gas streaming inward from each sleeve.

In FIG. 5 two opposite sets of electrodes and sleeves are shown. Electrodes 71 and 72 with sleeves 73 and 74 comprise one set. Electrodes 75 and 76 with sleeves 77 and 78 comprise the other set. Electrodes 71 and 72 with their sleeves have the same relative positions at the base of the catalyst chamber 81 as electrodes 16 and 17 have at the base of chamber 11 in FIG.2 In a direction at right angles but in the same horizontal plane as 71 and 72 are located electrodes 75 and 76 with their sleeves 77 and 78. Electrodes 75 and 76 are also parallel to each other just the way in which 16 and 17 are parallel to each other in FIG. 2. In this FIG.5 both of these sets have inward streams of reactant gas which assist in rotating a vortex of gas and catalyst particles about a common axis to provide vortex cavity 79. Vortex cavity 79 has the same function as cavity 13 in FIG. 2. The catalyst chamber 81 has the same function as chamber 11 in FIG.2 but for the sake of simplification and clarity the gas inlet manifold is not shown nor is the chamber cover with its exit port. In this FIG. 5 the catalyst bed 82 corresponds to 12 in FIG.2. Each of the two transformers 85 and 86 correspond to transformer 25 in FIG. 2 except that in this FIG. 5 transformers 84 and 85 are driven by two separate sources of low frequency alternating current and each source is 90° out of phase with the other in order to provide multiple electric arcs 80 across 71 and 72 and 75 and 76.

Throughout the drawings reference is made to the movement of reactant and product gases when describing the inrush of reactant gases through the electrode sleeves. Other references are made to reactant gas pressure being significant in order to displace particles of catalyst and to form a cavity within the catalyst bed. It is to be understood that such an inrush of gas and such a significant pressure, as well as the movement of product gas diffusing through through the catalyst bed, are all provided by specific appropriate means in the form of a gas pump or gas blower, but these means of circulating gas are not shown in the drawings as they are well understood by those skilled in the art. It is to be understood that the gases flowing into each inlet port in the drawings comes from a pressurizing source such as a gas pump.

It is not intended to limit the inventive concept to a particular pressure differential across the reaction chamber containing the catalyst. In one embodiment the pressure in the chamber is a twentieth of an atmosphere and in another it is an atmosphere and in still another it is three atmospheres, but intermediate pressures such as a sixth of an atmosphere are also effective and are included in the basic inventive concept.

I claim:

1. A nitrogen fixation system comprising:
(1) a low frequency, high voltage electric arc production means in the form of two electrodes with electrically insulating, coaxial sleeves, said electrodes being electrically connected to a low frequency, high voltage alternating current transformer, and said electric arc are being capable of raising nitrogen and oxygen to plasma state temperatures and of placing the gases into chemically excited states, and
(2) an electric arc chamber for contacting a catalyst with arc plasma gases, said chamber being in the form of a cavity which is produced by pressurized streams of reactant gases heated to the plasma state and expanding from within a catalyst bed in a chamber, the inner surface of said cavity being composed of catalyst particles being contacted and impacted by said outward moving plasma state reactant gases, and
(3) a product gas shielding means for shielding the gas product such as nitric oxide from the destructive effects of ultraviolet light emitted by the arc, said effects being capable of disassociating nitric oxide into nitrogen and oxygen, said shielding means being in the form of catalyst particles compacted by the weight of a vertical column of the catalyst bed above the arc cavity in the catalyst chamber and pressing downward about the cavity to provide a cavity wall of compacted catalyst particles opaque to light but permeable to the flow of gas species, and
(4) reactant gas transport means in the form of said electrode sleeves, said sleeves being capable of conducting nitrogen and oxygen from inlet ducts to the arc zone through cylindrical channels within said sleeves between the electrode and the inner wall of each sleeve, and
(5) heat transfer means in the form of gas driven particle turbulence whereby catalyst particles are moved by the reactant gas stream and plasma heat to and from the arc and the chamber walls, and
(6) reactant gas circulation means capable of producing gas pressure for impelling reactant and product gases through said arc zone and catalyst chamber and of producing such particle displacement as to form said arc cavity and sufficient particle agitation for rapid heat transfer.

2. A nitrogen fixation system as to claim 1 in which the cavity produced by pressurized streams of reactant gases is produced by a vortex generated by said gas streams within the catalytic bed as the streams impinge against one another olibquely.

3. A nitrogen fixation system as in claim 1 in which the cavity produced by pressurized streams of reactant gases is in the form of a bubble-like cavity in which the gas streams impinge directly against one another forcing aside catalytic particles and generating eddy currents of the catalytic particles in the catalyst bed.

4. A nitrogen fixation system as in claim 1 in which the catalyst contacted by the arc plasma gases is tungsten trioxide powder.

5. A nitrogen fixation system as in claim 1 in which the catalyst contacted by the plasma state gases is chromic oxide powder, $Cr_2O_3$.

6. A nitrogen fixation system as in claim 1 in which the catalyst contacted by the plasma state gases is copper chromite.

7. A nitrogen fixation system as in claim 1 in which the catalyst contacted by the plasma state gases is barium promoted copper chromite.

8. A nitrogen fixation system as in claim 1 in which the catalyst contacted by the plasma state gases is tantalum oxide.

9. A nitrogen fixation system as in claim 1 in which the catalyst contacted by the plasma state gases is magnesium oxide.

10. A nitrogen fixation system comprising:
(1) low frequency, high voltage electric arc production means in the form of four electrodes with electrically insulating, coaxial sleeves, said electrodes being in sets of two, each set being electrically connected to a low frequency, high voltage alternating current transformer, and being capable of supporting an electric arc across its two electrodes in such a manner that the arc from one electrode set is approximately perpendicular to the path of the other arc, both arcs being in an approximately horizontal plane with alternating current to one arc being at a ninety degree phase difference with the current to the other, both arcs being capable of raising nitrogen and oxygen to plasma state temperatures and of placing the gases into chemically excited states, and
(2) an electric arc chamber for contacting a catalyst with arc plasma gases, said chamber being formed by catalyst particles driven by reactant gas and plasma pressure as said pressure causes the particles to whirl in a vortex and move outward from a cavity at the center of a catalyst bed, and
(3) product gas shielding means to shield the gas product in the form of nitric oxi oxide from the destructive effects of ultraviolet light emissions from the electric arcs, said emissions being otherwise capable of photodisassociating nitric oxide into nitrogen and oxygen, said shielding means being in the form of said catalyst particles partially compacted by the weight of a vertical column of the catalyst bed above the arc chamber as said weight presses down on particles about said chamber to more densely aggregate the particles and to thereby impede the passage of ultraviolet light from the arcs to the product gas diffusing outward through the particles, and (4) reactant gas transport means in the form of cylindrical channels within said electrode sleeves, said channels being coaxial between the electrode and the inner wall of each sleeve, and (5) heat transfer means in the form of gas-driven particle turbulence whereby catalyst particles are moved by the streams of reactant gases and plasma heat to and from the arc zone and the chamber walls, said particles being heated by contact with the arc zone and being cooled by proximity to the catalyst chamber walls, and (6) reactant gas circulation means capable of producing gas pressure for impelling reactant and product gases through said arc zone and through said catalyst chamber and capable of producing such particle displacement as to form said arc chamber and to circulate catalyst particles to and from the arc zone and the catalyst chamber walls.

11. A nitrogen fixation system as in claims 1 and 10 in which the catalyst contacted by the plasma state gases from the electric arc discharge is tungstic oxide supported on porous alumina.

12. A nitrogen fixation system as in claims 1 and 10 in which the catalyst contacted by plasma state nitrogen and oxygen is barium promoted copper chromite supported on porous alumina.

13. A nitrogen fixation system as in claims 1 and 10 in which the catalyst is molybdenum oxide supported on porous alumina.

14. A nitrogen fixation system as in claims 1 and 10 in which the catalyst is tantalum oxide supported on porous alumina.

* * * * *